Patented Jan. 19, 1926.

1,570,333

UNITED STATES PATENT OFFICE.

IVAR WALFRID CEDERBERG, OF BERLIN-STEGLITZ, GERMANY, ASSIGNOR TO NORSK HYDRO-ELEKTRISK KVAELSTOFAKTIESELSKAB, OF CHRISTIANIA, NORWAY.

PROCESS FOR THE PRODUCTION OF CATALYZERS FOR THE SYNTHESIS OF AMMONIA.

No Drawing. Application filed July 14, 1924. Serial No. 725,896.

*To all whom it may concern:*

Be it known that I, IVAR WALFRID CEDERBERG, a subject of the King of Sweden, residing at Friedrichstrasse 10/11, Berlin-Steglitz, Germany, have invented certain new and useful Improvements in Processes for the Production of Catalyzers for the Synthesis of Ammonia; and I do hereby declare the following to be a full, clear, and exact description of the invention, such as will enable others skilled in the art to which it appertains to make and use the same.

As it is known, metals which belong to the iron group are used as catalyzers for the technical synthesis of ammonia. The material from which such catalyzers are produced, is generally made by treating compounds of the aforementioned metals with various reagents in an aqueous solution or in suspension and removing the water. As such reagents has been proposed cyanides, alumina, chlorides and hydroxydes of alkalis. From this solution either new compounds originate or an intimate mixture of the raw materials is obtained.

It is not, however, always possible to thoroughly eliminate the water, especially as it is very often chemically bound. The efficiency of the catalyzer is thus greatly reduced, as water, even in very small quantities, has an extremely detrimental effect on catalyzers of the kind mentioned.

This drawback is avoided by the present invention by using instead of water, an anhydrous liquid ammonia. It has been proved that reactions take place in this liquid that produces materials which, after subsequent treatment, produce very efficient catalyzers—reactions to which nothing equal can be obtained in a hydrous solution. All superfluous ammonia is easily eliminated by evaporation at the usual temperature, and the quantity of ammonia that eventually remains in the material, from which the catalyzers are to be produced, has more a beneficial than a detrimental effect on the formation of the catalyzers.

As well known, ammonia is a good solvent for various materials but it may also be used in connection with insoluble materials, as good results are obtained also in the event of one or more of said materials forming a suspension in the ammonia.

The following may be given as an example of how the process may be performed:

2 kilogrammes of anhydrous ferric chloride are mixed together with 5 kilogrammes of dry cyanide of potassium and 30 litres of liquid ammonia during active stirring. The ammonia is then eliminated by boiling of the solution. The residue is slowly heated in an atmosphere that is non-oxydizing and up to such a temperature that the mass does not frit together.

Claims:

1. Process for the production of catalyzers for the synthesis of ammonia consisting in mixing compounds of metals of the iron group with cyanides in a medium of liquid, anhydrous ammonia, freeing the mixture from a surplus of ammonia and heating it in a non-oxydizing atmosphere.

2. Catalyzers manufactured according to the process set forth in claim 1.

In testimony that I claim the foregoing as my invention, I have signed my name.

IVAR WALFRID CEDERBERG.